(12) United States Patent
Shinagawa

(10) Patent No.: US 8,712,119 B2
(45) Date of Patent: Apr. 29, 2014

(54) SYSTEMS AND METHODS FOR COMPUTER-AIDED FOLD DETECTION

(75) Inventor: Yoshihisa Shinagawa, Downingtown, PA (US)

(73) Assignee: Siemens Medical Solutions USA, Inc., Malvern, PA (US)

(\*) Notice: Subject to any disclaimer, the term of this patent is extended or adjusted under 35 U.S.C. 154(b) by 901 days.

(21) Appl. No.: 12/879,038

(22) Filed: Sep. 10, 2010

(65) Prior Publication Data

US 2011/0064288 A1 Mar. 17, 2011

Related U.S. Application Data

(60) Provisional application No. 61/241,602, filed on Sep. 11, 2009.

(51) Int. Cl.
*G06K 9/00* (2006.01)
*G06K 9/50* (2006.01)

(52) U.S. Cl.
USPC .......................... 382/128; 382/131; 382/201

(58) Field of Classification Search
None
See application file for complete search history.

(56) References Cited

U.S. PATENT DOCUMENTS

| 7,260,250 | B2* | 8/2007 | Summers et al. | 382/128 |
| 2010/0183210 | A1* | 7/2010 | Van Uitert et al. | 382/131 |
| 2010/0189326 | A1* | 7/2010 | McGinnis et al. | 382/131 |

OTHER PUBLICATIONS

Olivier Monga and Serge Benayoun, "Using Partial Derivatives of 3D Images to Extract Typical Surface Features", Computer Vision and Image Understanding, vol. 61, No. 2, Mar. 1995, pp. 171-189.
Ioannis Douros and Bernard Buxton, "Three-Dimensional Surface Curvature Estimation Using Quadric Surface Patches", Department of Computer Science, University College London.
Jianhua Yao et al., "Detection and Segmentation of Colonic Polyps on Haustral Folds", Diagnostic Radiology Department, Clinical Center, National Institute of Health (2007) Bethesda, MD, pp. 900-903.
Yoshinobu Sato, et al., "Tissue Classification Based on 3D Local Intensity Structures for Volume Rendering", IEEE Transactions on Visualization and Computer Graphics, vol. 6, No. 2, Apr.-Jun. 2000, pp. 160-180.

\* cited by examiner

*Primary Examiner* — Chan Park
*Assistant Examiner* — Ha Le
(74) *Attorney, Agent, or Firm* — Peter R. Withstandley

(57) ABSTRACT

Described herein is a computer-aided technology for facilitating detection of folds of an object surface. In one implementation, image data is processed to determine curvature characteristics at one or more points of the surface of a region of interest. If the curvature characteristics of one of the one or more points correspond to a hyperbolic curvature, the point is identified as a seed point. A region of a predetermined thickness is grown around the seed point so as to detect the presence of any fold feature within the grown region.

20 Claims, 8 Drawing Sheets

500

602  606 604  608

600

SYSTEMS AND METHODS FOR COMPUTER-AIDED FOLD DETECTION

CROSS-REFERENCE TO RELATED APPLICATION

The present application claims the benefit of U.S. provisional application No. 61/241,602 filed Sep. 11, 2009, the entire contents of which are herein incorporated by reference.

TECHNICAL FIELD

The present disclosure relates generally to automated or partially automated analysis of digital or digitized images, and more particularly to computer-aided detection of folds in image data.

BACKGROUND

The field of medical imaging has seen significant advances since the time x-rays were first used to determine anatomical abnormalities. Medical imaging hardware has progressed in the form of newer machines such as Medical Resonance Imaging (MRI) scanners, Computed Axial Tomography (CAT) scanners, etc. Because of the large amount of image data generated by such modern medical scanners, there has been and remains a need for developing image processing techniques that can automate some or all of the processes to determine the presence of anatomical structures and abnormalities in scanned medical images.

Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or medical condition, the speed with which an image can be processed and structures within that image recognized can be of the utmost importance to the doctor reaching an early diagnosis. Hence, there is a need for improving recognition techniques that provide accurate and fast recognition of anatomical structures and possible abnormalities in medical images.

Digital medical images are constructed using raw image data obtained from a scanner, for example, a CAT scanner, MRI, etc. Digital medical images are typically either a two-dimensional ("2-D") image made of pixel elements or a three-dimensional ("3-D") image made of volume elements ("voxels"). Such 2-D or 3-D images are processed using medical image recognition techniques to determine the presence of anatomical structures such as cysts, tumors, polyps, etc. Given the amount of image data generated by any given image scan, it is preferable that an automatic technique should point out anatomical features in the selected regions of an image to a doctor for further diagnosis of any disease or medical condition.

One general method of automatic image processing employs feature based recognition techniques to determine the presence of anatomical structures in medical images. However, feature based recognition techniques can suffer from accuracy problems.

Automatic image processing and recognition of structures within a medical image is generally referred to as Computer-Aided Detection (CAD). A CAD system can process medical images and identify anatomical structures including possible abnormalities for further review. Such possible abnormalities are often called candidates and are considered to be generated by the CAD system based upon the medical images.

Cancer is one of the leading causes of death in the world. One common and often fatal type of cancer is colon or colorectal cancer. Colon cancer presents as a solid cancerous growth that is believed to begin from a benign growth (called colonic polyp) on the inner surface of the colon and rectum. Studies have shown that early identification of precursor polyps in the colonic lumen may be a critical first step in detecting, treating and preventing colon cancer.

Various methods have been proposed for screening patients for potential development of colon cancer. The use of imaging technology in concert with computer-aided diagnosis (CAD) systems has been gaining in popularity due to their minimally-invasive nature, and therefore decreased discomfort to the patient as compared to manual optical colonoscopy. CAD methods may be used to detect and highlight polyps in a three-dimensional volume, which is reconstructed from cross-sectional slices obtained by imaging technologies such as computed tomography (CT) or magnetic resonance (MR). A virtual fly-through of the reconstructed model of the colon enables physicians to examine any suspicious polyps inside the colon in a manner similar to a clinical colonoscopy. Although the time and cost of such examination can be greatly reduced by CAD methods, the task of identifying true polyps and removing false positives is complicated by the presence of different structures in the colon.

FIG. 1 shows a diagram of a cross-section of a colon 100 having different structures (102, 104, 106). As shown, the colon 100 may have a ridge-like haustral fold 102 and a flat colon wall 104. When there is a polyp 106 on a haustral fold 102, it is often difficult to detect the polyp 106 because its shape varies according to the shape of the haustral fold 102, causing the boundary between the polyp and the fold to be vague. The presence of haustral fold 102 also accounts for a large number of false positive findings because parts of the fold resemble a polyp. In order to increase the accuracy of the computer-aided detection, it is desirable to segment and distinguish folds from polyps and other structures. The detection and marking of folds also helps the user to visually correlate the various components of the colon in the prone and supine views.

There are several approaches available to assist physicians in detecting haustral folds. Unfortunately, existing techniques generally do not provide satisfactory accuracy and efficiency. For example, such techniques are unable to distinguish polyps and folds where the folds are too complex. In addition, conventional methods do not discriminate between different parts of a fold, such as the face, base or ridge. Such differentiation is particularly useful in the detection of polyps because a polyp on a face of a fold appears quite different from a polyp at the base of a fold.

As such, improved systems and methods for computer-aided fold detection that overcomes the aforementioned disadvantages are desired.

SUMMARY

According to one aspect of the present disclosure, a method of detecting folds in a digitized medical image is disclosed, the method including receiving image data including a region of interest, calculating curvature characteristics at one or more points corresponding to a surface of the region of interest, identifying at least one of the one or more points as a seed point if its curvature characteristics correspond to a hyperbolic curvature, detecting a fold by growing a region around the seed point to a predetermined thickness and identifying at least one fold feature within the region. The region of interest can include a portion of a colon. The curvature characteristics can include a minimum curvature, a maximum curvature and a principal direction, Identifying at least one of the one or more points can include identifying at least one of the one or more points as a seed point if its minimum curvature is less than a first threshold value and its maximum curvature more than a second threshold value. The growing step can include finding voxels adjacent to the seed point having intensity values within a predetermined range identified for a material of interest. The material of interest can include tissue. The growing step can include growing the region to different predetermined thicknesses to detect multiple fold features. The fold features can include a ridge, a face, a base or an extended base of the fold. The fold feature can be a ridge of the fold, a base of the fold, or a face of the fold. The identifying step can include detecting the fold feature within one or more local neighborhoods within the region, wherein the one or more local neighborhoods are associated with a material composition that satisfies a pre-defined criterion. The one or more local neighborhoods can include a sphere centered at the seed point. The material composition can include a ratio of air and tissue. The pre-defined criterion can include the ratio being less than a third threshold value. The one or more local neighborhoods can be defined by different radii to detect multiple fold features. The identifying step can include detecting the fold feature within one or more local neighborhoods within the region, wherein the one or more local neighborhoods are associated with a minimum tissue thickness that is within a predetermined range. The identifying step can include detecting the fold feature within one or more local neighborhoods within the region, wherein the one or more local neighborhoods are associated with a distribution of tissue thicknesses, wherein a difference between the distribution of tissue thicknesses and a predetermined distribution is less than a fourth threshold value.

According to another aspect of the present disclosure, a computer readable medium embodying a program of instructions executable by a machine to perform steps for detecting folds within a digitized medical image is disclosed. The steps including receiving image data including a region of interest, calculating curvature characteristics at one or more points corresponding to a surface of the region of interest, identifying at least one of the one or more points as a seed point if its curvature characteristics correspond to a hyperbolic curvature, and detecting a fold by growing a region around the seed point to a predetermined thickness and identifying at least one fold feature within the region.

According to yet another aspect of the present disclosure, an image analysis system is disclosed, comprising a memory device for storing computer readable program code, and a processor in communication with the memory device, the processor being operative with the computer readable program code to: receive image data including a region of interest; calculate curvature characteristics at one or more points corresponding to a surface of the region of interest; identify at least one of the one or more points as a seed point if its curvature characteristics correspond to a hyperbolic curvature; and detect a fold by growing a region around the seed point to a predetermined thickness and identifying at least one fold feature within the region.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. The same numbers are used throughout the drawings to reference like elements and features.

DETAILED DESCRIPTION

Figure 1:
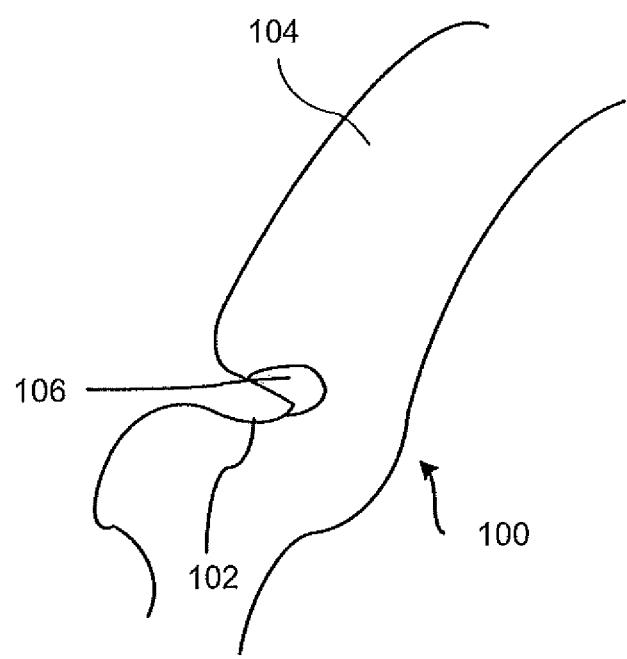
FIG. 1 shows an exemplary cross-section of a colon.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to x-ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulate and transform data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2D images and voxels for 3D images). The image may be, for example, a medical image of a subject collected by computed tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2D picture or a 3D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The following description sets forth one or more implementations of systems and methods that facilitate detection of folded portions of an object surface. One implementation of the present fold detection framework takes into account both the curvature and thickness of the wall of the object. By using both curvature and thickness, false positives caused by a highly convoluted tubular structure are minimized. For example, if a colon is bent into an S-shape, sections of the colon wall are thinned out. If the fold detection is based only on the thickness of the wall, the thin walls will be falsely detected as folds. If the fold detection is based on only curvature, folds and curved sections cannot be differentiated.

It is noted that, while a particular application directed to analysis of folds in computer-aided diagnosis of colon cancer is shown, the technology is not limited to the specific embodiment illustrated. The present technology has application to, for example, characterizing and detecting folds in other types of anatomical structures (e.g., airway, urinary gall bladder, aorta, artery, etc.) or non-anatomical structures (e.g., fuel injection systems, etc.).

Figure 2:
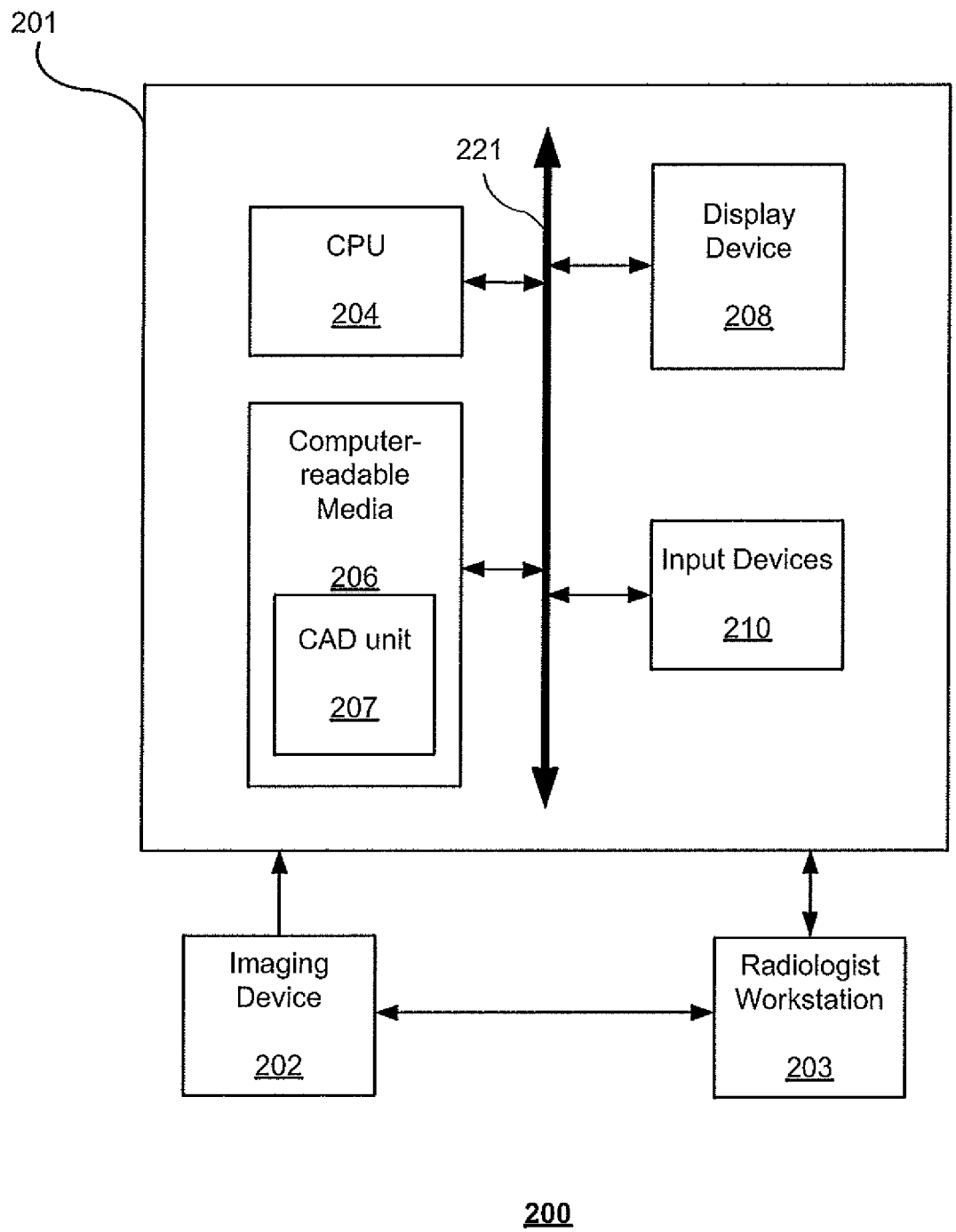
FIG. 2 shows a block diagram of an exemplary CAD system.

FIG. 2 shows a block diagram illustrating an exemplary CAD system 200. The CAD system 200 includes a computer system 201 for implementing the framework as described herein. The computer system 201 may be further connected to an imaging device 202 and a radiologist workstation 203, over a wired or wireless network. The imaging device 202 may be a radiology seamier such as a MR scanner or a CT seamier.

Computer system 201 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 201 comprises a processor or central processing unit (CPU) 204 coupled to one or more computer-readable media 206 (e.g., computer storage or memory), display device 208 (e.g., monitor) and various input devices 210 (e.g., mouse or keyboard) via an input-output interface 221. Computer system 201 may further include support circuits such as a cache, power supply, clock circuits and a communications bus.

It is to be understood that the present technology may be implemented in various forms of hardware, software, firmware, special purpose processors, or a combination thereof. In one implementation, the techniques described herein may be implemented as computer-readable program code tangibly embodied in computer-readable media 206. Computer-readable media 206 may include random access memory (RAM), read only memory (ROM), magnetic floppy disk, flash memory, and other types of memories, or a combination thereof. The computer-readable program code may be executed by CPU 204 to process images (e.g., MR or CT images) from the imaging device 202 (e.g., MR or CT scanner). As such, the computer system 201 is a general-purpose computer system that becomes a specific purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein.

Computer system 201 may also include an operating system and microinstruction code. The various techniques described herein may be implemented in either as part of the microinstruction code in CAD unit 207 or as part of an application program or software product, or a combination thereof, which is executed via the operating system. Various other peripheral devices, such as additional data storage devices and printing devices, may be connected to the computer system 201.

The radiologist workstation 203 may include a computer and appropriate peripherals, such as a keyboard and display, and can be operated in conjunction with the entire CAD system 200. For example, the radiologist workstation 203 may communicate with the imaging device 202 so that the image data collected by the imaging device 202 can be rendered at the radiologist workstation 203 and viewed on the display. The radiologist workstation 203 may include a user interface that allows the radiologist or any other skilled user (e.g., physician, technician, operator) to manipulate the image data. For example, the radiologist may identify regions of interest in the image data, or annotate the regions of interest using pre-defined descriptors via the user-interface. Further, the radiologist workstation 203 may communicate directly with the computer system 201 to access and display previously processed image data so that a radiologist can manually verify the results of the present framework.

Figure 3:
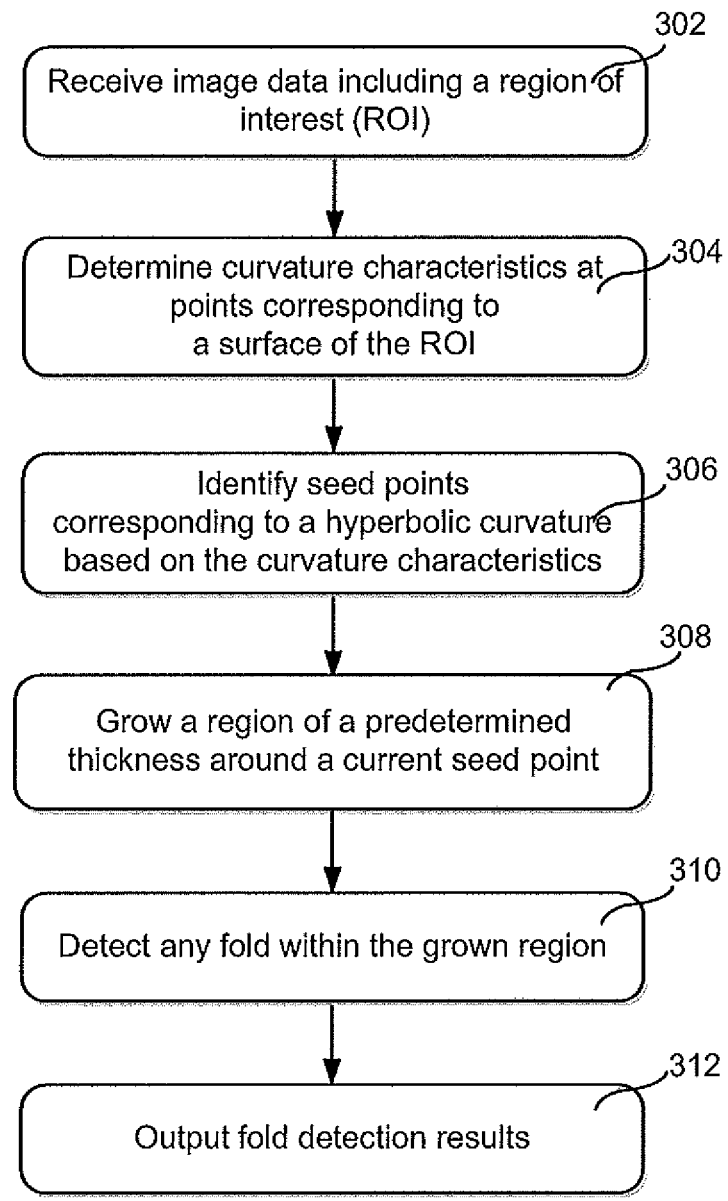
FIG. 3 shows an exemplary method which may be implemented by the exemplary CAD system.

FIG. 3 shows an exemplary method 300 which may be implemented by the CAD unit 207. In the discussion of FIG. 3 and subsequent figures, continuing reference may be made to elements and reference numerals shown in FIG. 2.

At 302, the CAD unit 207 receives image data. The image data may comprise, for example, two-dimensional (2D) cross-sectional images or three-dimensional (3D) volumetric image data reconstructed from acquired cross-sectional slice images. The cross-sectional images may be acquired by imaging device 202 using magnetic resonance (MR) imaging, computed tomography (CT), helical CT, x-ray, positron emission tomography, fluoroscopy, ultrasound or single photon emission computed tomography (SPECT). Other types of imaging modalities may also be used. In one implementation, the image data comprises digitized medical images of an anatomical structure (e.g., colon, rectum, lung), or at least a portion of the anatomical structure. In some implementations, multiple images may be acquired by imaging a structure of interest at different angles. For example, a patient may be imaged in the prone and the supine positions. Multiple volumes may also be acquired by imaging a patient at different times.

The image data can be pre-processed, either automatically by the computer system 201, manually by a skilled user (e.g., radiologist), or a combination thereof. Various types of pre-processing may be performed. In one implementation, pre-processing the image data comprises segmenting the image data to delineate regions of interest (ROI). An ROI refers to a volume or area (e.g., central slice of the volume) identified for further study and processing. For example, an ROI may be associated with a colon or a portion thereof to be screened for polyps. The ROI may be automatically detected by the computer system 201 using a computer-aided detection technique, such as one that detects points where the increase in voxel intensity is above a certain threshold. Alternatively, ROIs may be identified manually by, for example, a skilled user via a user-interface at the radiologist workstation 203.

At 304, the image data is processed to determine curvature characteristics at points corresponding to a surface of the ROI. For example, in the context of virtual colonoscopy, curvature characteristics may be computed at vertices on a segmented colon wall. In one implementation, curvature characteristics comprise the minimum curvature (Kmin), the maximum curvature (Kmax), and principal directions (D). Kmin and Kmax, also referred to as principal curvatures, are oriented in the principal directions (D) and are eigenvalues of the shape operator. Other types of curvature characteristics, such as the mean curvature or the Gaussian curvature, may also be computed. These curvature characteristics are used to measure how the surface bends by different amounts in different directions at a point.

Various approaches may be employed to compute the curvature characteristics. The curvature characteristics may be computed in a local neighborhood around the point of interest on the surface. In one implementation, a surface patch fitting method is used to estimate the curvature characteristics. The surface patch fitting method re-orientates the surface of interest such that it can be locally approximated by a bivariate function (e.g., cubic B-spline, paraboloid, quadratic polynomial, etc.). Alternatively, a gradient method is used for estimating the curvature characteristics by computing the partial derivatives at selected points on the surface of interest. In one implementation, the gradient method approximates the local curvature extrema (Kmin, Kmax) from the first, second and third partial derivatives of the gray level function corresponding to the volume image data. Other methods of computing curvature characteristics may also be applied.

Figure 4A:
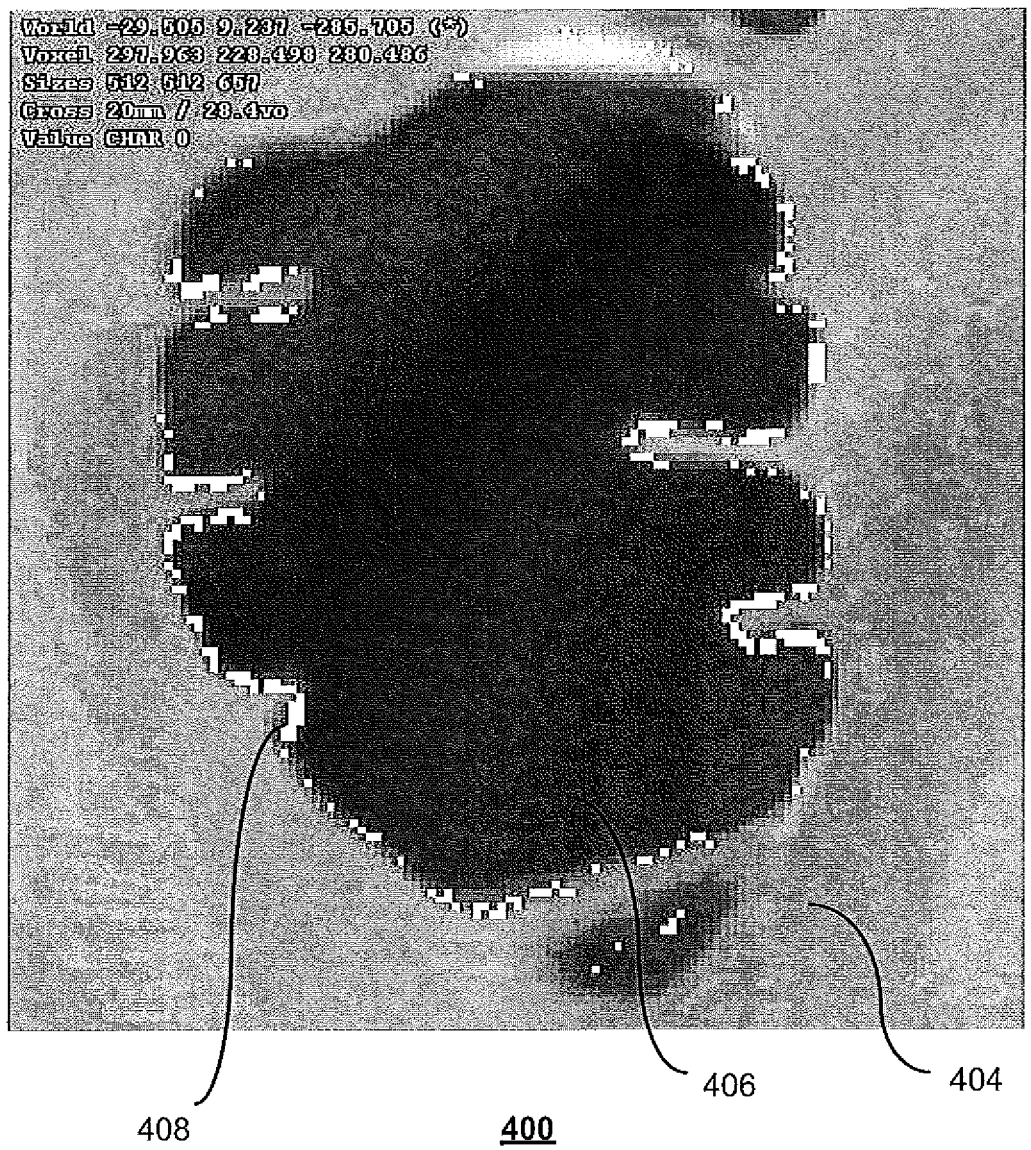
FIG. 4a shows an exemplary slice image.

At 306, seed points in the ROI are identified. In one implementation, one or more points corresponding to the surface of the ROI are identified as seed points if their curvature characteristics correspond to a hyperbolic or saddle-shape curvature. For purposes of illustration, FIG. 4a shows an exemplary slice image 400. A portion of a colon wall 404 surrounds an interior air space 406. Seed points 408 (depicted as white spots) are detected on the interior surface of the colon wall 404 where the curvatures are hyperbolic.

In one implementation, a hyperbolic curvature is identified where Kmin is less that a first threshold value (e1), and Kmax is greater than a second threshold value (e2). i.e. Kmin<e1 and Kmax>e2. The first and second threshold values (e1, e2) are generally of the opposite sign. E.g., e1=−0.1 and e2=0.1. Other pre-determined threshold values may also be used. The threshold values may be selected based on the scale (e.g., size of the fold) and/or resolution of the image data. For example, for CT slice images that are 512×512 pixels each, the values of e1 and e2 may be pre-selected at, but are not limited to, about −0.1 and 0.1 respectively. It is understood that larger threshold values may be selected for bigger scales or higher resolutions.

Returning to FIG. 3, at 308, a region growing process is performed. In one implementation, one or all of the seed points identified at 306 are used as starting points for the region growing process. The region growing process grows regions of a predetermined thickness around the seed points. The region growing process seeks to localize the shape and detect any fold features that may be present on the surface of the ROI. The region growing process may be adapted to segment the ridge, face, base and/or extended base of the folds.

In one implementation, the region growing process is performed by finding voxels adjacent to the current seed point that have intensity values within a predetermined range. The predetermined range of intensity values is associated with a certain material of interest. The material of interest may be, for example, tissue, bone, vessels or any other material corresponding to the region of interest. The predetermined intensity range associated with soft fatty tissue imaged by CT is, for example, about −120 to 40 Hounsfield Units (HU). It is understood that different predetermined intensity ranges may be associated with different materials. The predetermined intensity range may also depend on the type of imaging modality used.

The region growing process continues until at least one predetermined thickness is reached. Sub-regions grown from different seed points may overlap to form a combined grown region. The predetermined thickness of the grown region may be selected interactively or calculated automatically based on surface characteristics. In one implementation, the region is grown to multiple predetermined thicknesses to detect various features of the fold within the region. A fold feature, as used herein, refers to a part or portion (e.g., ridge, face, base, extended base, etc.) of a fold. Different thicknesses may be used for detecting different features of the fold. A fold ridge, face, base and extended base may be detected by selecting progressively larger threshold values. It is understood that other features and threshold values may also be applicable.

At 310, the grown region is analyzed to detect any fold therein. In one implementation, a fold or fold feature is detected if the material composition associated with one or more local neighborhoods within the grown region satisfies a pre-defined criterion. The local neighborhood may be defined by various exemplary methods. For example, the local neighborhood may be defined by a sphere of radius R, centered at a seed point. Other types of local neighborhoods, such as a cubic volume, may also be defined. The radius R of the local neighborhood may be selected according to the type of fold features to be detected. For example, if a fold ridge is to be detected, the radius R1 may be about 3.5 mm. To detect a fold face, the radius may be increased by, for example, a multiplication factor (e.g. $\sqrt[3]{\sqrt{2}}$). The radius may be further increased for detecting fold bases and extended bases by using larger multiplication factors (e.g., $\sqrt[3]{\sqrt{2}^2}$ and $\sqrt[3]{\sqrt{2}^3}$ respectively). The radius of the sphere can be selected interactively or calculated automatically based on surface characteristics. It is understood that other methods of selecting the radius are also useful.

Figure 4B:
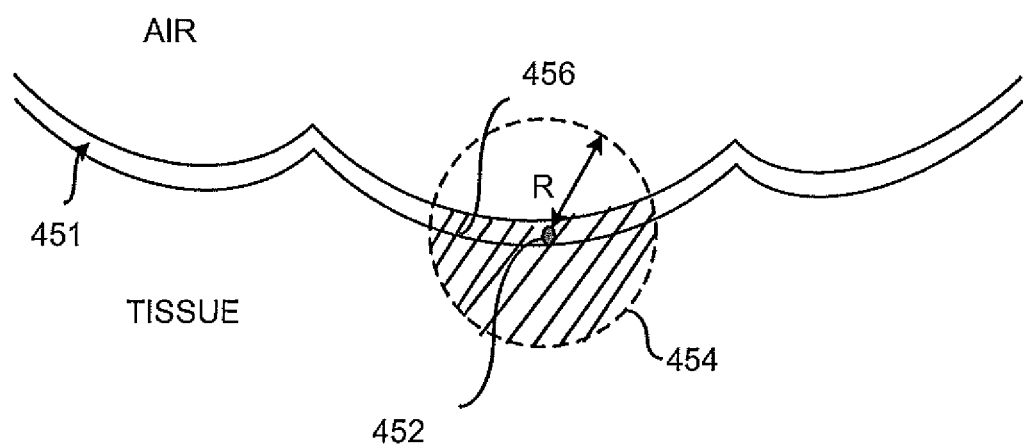
FIG. 4b shows an exemplary cross-section of a portion of a colon wall.

FIG. 4b shows an exemplary cross-section 450 of a portion of a colon wall 451. As shown, the local neighborhood around seed point 452 is defined by a sphere 454 of radius R. In order to detect if there is a fold within the sphere 454, the material composition of the sphere 454 is evaluated. In one implementation, the material composition comprises air and soft tissue. Other types of materials (e.g., fluid, stool) may also be associated with the sphere. The image units of each material exhibit a certain intensity range. For example, the image units of air typically exhibit relatively low intensity values (e.g., about −1000 HU, or less than or equal to about −800 HU in the presence of noise), while image units of soft tissue typically exhibit intensity values in the range of −120 to 40 HU.

In one implementation, the material composition is defined as the ratio of air (non shaded portion) and soft tissue (shaded portion). If the ratio is below a predetermined threshold value, a fold or fold feature is detected within the sphere 454. Conversely, if the ratio is above a pre-determined threshold value, the soft tissue inside the sphere 454 is determined to be not part of a fold, but part of a flat portion of the colon wall. In other words, the grown region 456 may be discarded from the fold detection results. The predetermined threshold value includes, but is not limited to, about 0.25.

Other methods of defining the detection criteria are also useful. For example, the thickness of the tissue may be used to detect a fold feature. More particularly, if the minimum tissue thickness along all directions from the seed point is within a pre-determined range, then a fold feature is detected. Alternatively, the fold feature may be detected where the difference between a predetermined distribution and the distribution of tissue thicknesses along all directions from the seed point is less than a threshold value. The distribution of thicknesses may be represented by, for example, a histogram, a probability density function or any other suitable representations.

At 312, the fold detection results are output. There are various approaches for outputting the results of fold detection method 300. For example, a mask representing the regions that are detected as folds may be stored in the computer readable media 206 as a file. The file may be formed in accordance with, for example, the Digital Imaging and Communications in Medicine (DICOM) structure report. Images of the segmented structure of interest may be rendered and displayed from the file on, for example, display device 208. In the context of virtual colonoscopy, the images of the colon may be presented in ways that are suitable for a physician to inspect a colon via, for example, a graphical user interface.

Figure 5:
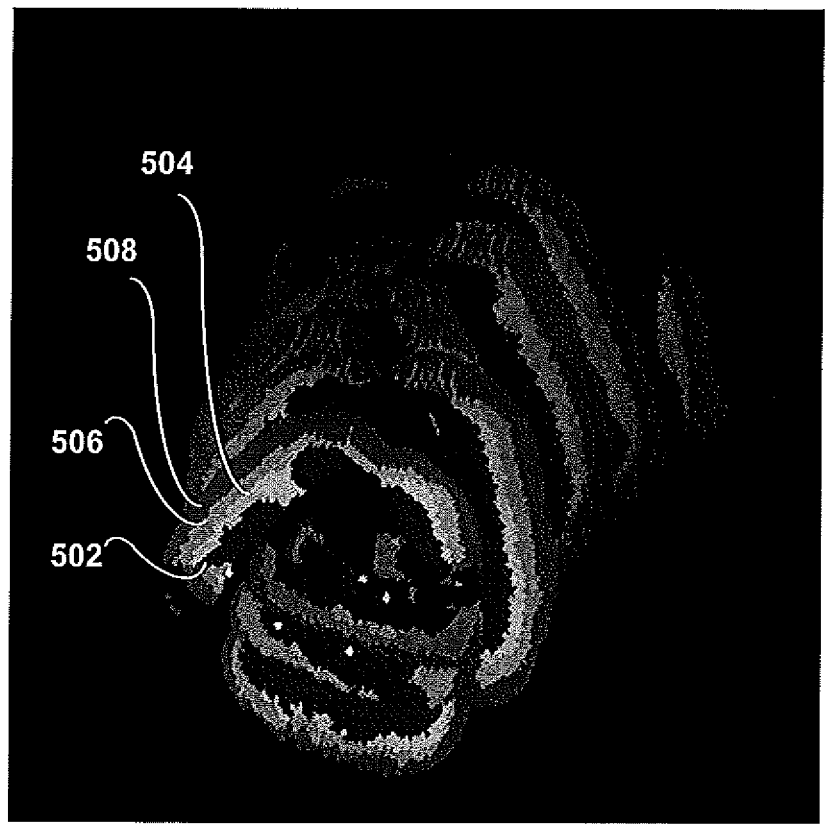
FIGS. 5, 6 and 7 show image slices illustrating segmented portions of a colon.

FIG. 5 shows an image slice 500 illustrating portions of a colon that are identified and segmented by performing the steps described with reference to FIG. 3. The innermost portions 502 indicate a detected fold ridge, the portions 504 indicate the fold face, the portions 506 indicate the fold base, and the outermost portions 508 indicate the fold extended base.

Figure 6:
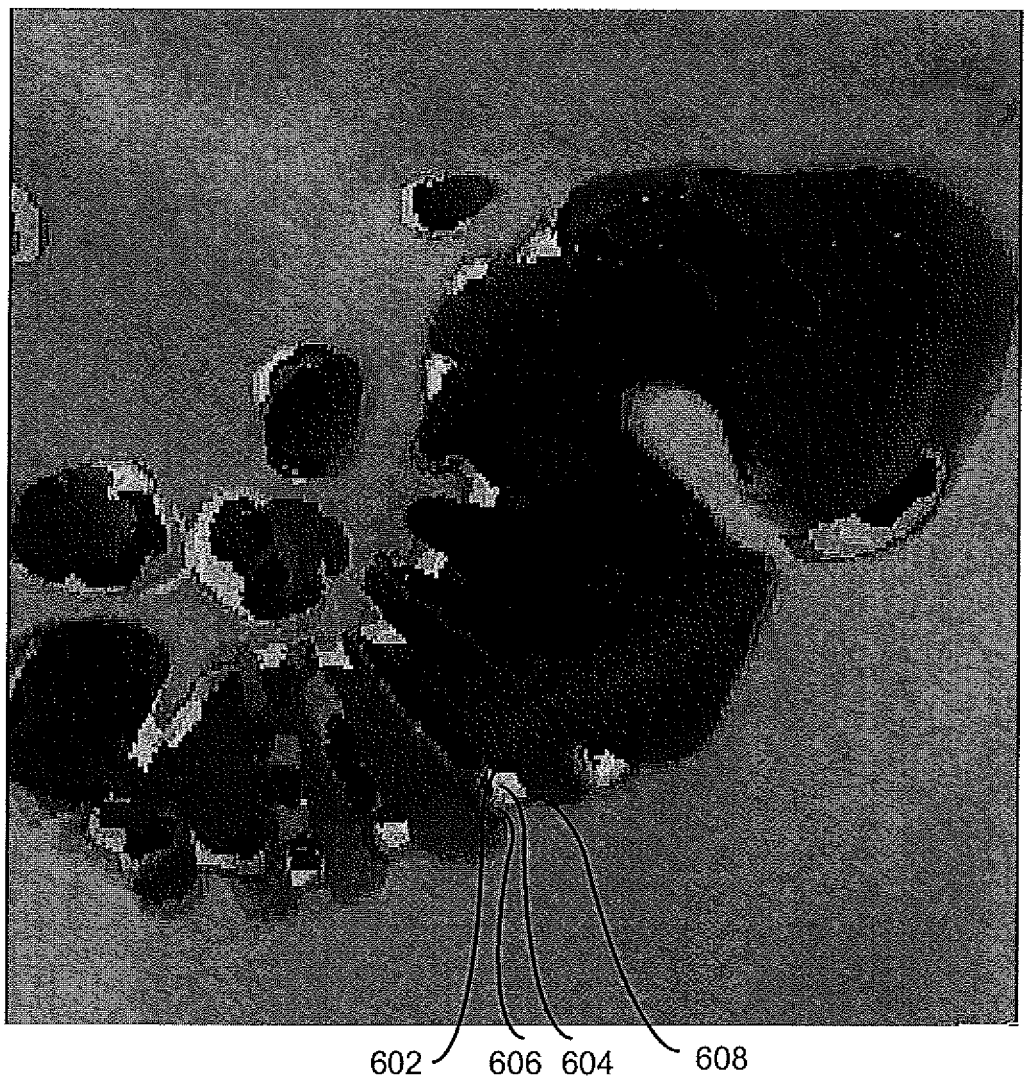
Figure 7:
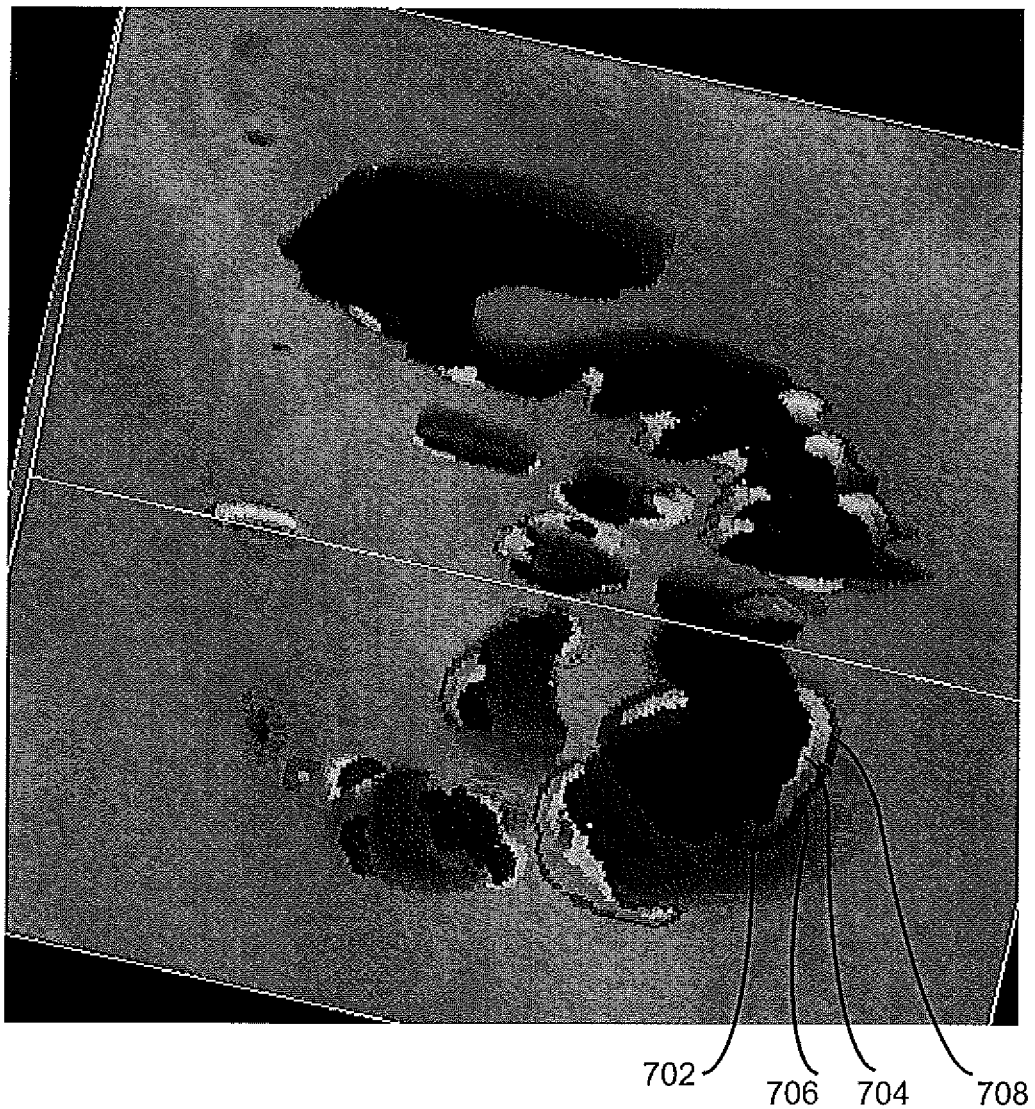

Similarly, FIGS. 6 and 7 show an image slice 600 and 700 illustrating portions of a colon that are identified and segmented by the steps described previously with respect to FIG. 3. The innermost portions 602 (or 702) indicate a detected fold ridge, the portions 604 (or 704) indicate the fold face, the portions 606 (or 706) indicate the fold base, and the outermost portions 608 (or 708) indicate the fold extended base.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of detecting folds in a digitized medical image, comprising:
   receiving image data including a region of interest;
   calculating curvature characteristics at one or more points corresponding to a surface of the region of interest;
   identifying at least one of the one or more points as a seed point if its curvature characteristics correspond to a hyperbolic curvature; and
   detecting a fold by growing a region around the seed point to a predetermined thickness and identifying at least one fold feature within the region.

2. The method of claim 1 wherein the region of interest comprises a portion of a colon.

3. The method of claim 1 wherein the curvature characteristics comprise a minimum curvature, a maximum curvature and a principal direction.

4. The method of claim 1 wherein the identifying the at least one of the one or more points comprises identifying the at least one of the one or more points as a seed point if its minimum curvature is less than a first threshold value and its maximum curvature more than a second threshold value.

5. The method of claim 1 wherein the growing comprises finding voxels adjacent to the seed point having intensity values within a predetermined range identified for a material of interest.

6. The method of claim 5 wherein the material of interest comprises tissue.

7. The method of claim 1 wherein the growing comprises growing the region to different predetermined thicknesses to detect multiple fold features.

8. The method of claim 7 wherein the fold features comprise a ridge, a face, a base or an extended base of the fold.

9. The method of claim 1 wherein the fold feature comprises a ridge of the fold.

10. The method of claim 1 wherein the fold feature comprises a face of the fold.

11. The method of claim 1 wherein the fold feature comprises a base or an extended base of the fold.

12. The method of claim 1 wherein the identifying the at least one fold feature comprises detecting the fold feature within one or more local neighborhoods within the region, wherein the one or more local neighborhoods are associated with a material composition that satisfies a pre-defined criterion.

13. The method of claim 12 wherein the one or more local neighborhoods comprises a sphere centered at the seed point.

14. The method of claim 12 wherein the material composition comprises a ratio of air and tissue.

15. The method of claim 14 wherein the pre-defined criterion comprises the ratio being less than a third threshold value.

16. The method of claim 12 wherein the one or more local neighborhoods are defined by different radii to detect multiple fold features.

17. The method of claim 1 wherein the identifying the at least one fold feature comprises detecting the fold feature within one or more local neighborhoods within the region, wherein the one or more local neighborhoods are associated with a minimum tissue thickness that is within a predetermined range.

18. The method of claim 1 wherein the identifying the at least one fold feature comprises detecting the fold feature within one or more local neighborhoods within the region, wherein the one or more local neighborhoods are associated with a distribution of tissue thicknesses, wherein a difference between the distribution of tissue thicknesses and a predetermined distribution is less than a fourth threshold value.

19. A non-transitory computer readable medium embodying a program of instructions executable by a machine to perform steps for detecting folds within a digitized medical image, the steps comprising:
   receiving image data including a region of interest;

calculating curvature characteristics at one or more points corresponding to a surface of the region of interest;

identifying at least one of the one or more points as a seed point if its curvature characteristics correspond to a hyperbolic curvature; and detecting a fold by growing a region around the seed point to a predetermined thickness and identifying at least one fold feature within the region.

20. An image analysis system, comprising:

a memory device for storing computer readable program code; and a processor in communication with the memory device, the processor being operative with the computer readable program code to:

receive image data including a region of interest;

calculate curvature characteristics at one or more points corresponding to a surface of the region of interest;

identify at least one of the one or more points as a seed point if its curvature characteristics correspond to a hyperbolic curvature; and detect a fold by growing a region around the seed point to a predetermined thickness and identifying at least one fold feature within the region.

* * * * *